US00RE36912E

United States Patent [19]

Donovan

[11] E Patent Number: Re. 36,912

[45] Reissued Date of Patent: Oct. 17, 2000

[54] METHOD AND APPARATUS FOR CONTAINING AND SUPPRESSING EXPLOSIVE DETONATIONS

[75] Inventor: John L. Donovan, Danvers, Ill.

[73] Assignee: ABC-Naco Inc., Downers Grove, Ill.

[21] Appl. No.: 09/083,667

[22] Filed: May 22, 1998

Related U.S. Patent Documents

Reissue of:

[64] Patent No.: 5,613,453
Issued: Mar. 25, 1997
Appl. No.: 08/578,200
Filed: Dec. 29, 1995

[51] Int. Cl.[7] ..... F23G 7/00

[52] U.S. Cl. ..... 110/237; 110/346; 588/202; 72/56; 86/50

[58] Field of Search ..... 110/173 B, 173 C, 110/193, 237, 346; 588/202; 109/26, 27, 29; 72/54, 56, 706; 29/421.2; 86/50

[56] References Cited

U.S. PATENT DOCUMENTS

| | | | |
|---|---|---|---|
| 3,408,432 | 10/1968 | Tumm et al. . | |
| 3,464,249 | 9/1969 | Klein . | |
| 3,485,075 | 12/1969 | Kiselev et al. | 72/56 |
| 3,611,766 | 10/1971 | Klein et al. . | |
| 3,800,715 | 4/1974 | Boller . | |
| 3,903,814 | 9/1975 | Altekruse | 110/237 |
| 3,910,084 | 10/1975 | Paton et al. . | |
| 3,915,104 | 10/1975 | Hapgood et al. | 110/193 |
| 4,079,612 | 3/1978 | Smirnov et al. . | |
| 4,081,982 | 4/1978 | Minin et al. . | |
| 4,085,883 | 4/1978 | Deribas et al. . | |
| 4,100,783 | 7/1978 | Gambarov et al. . | |
| 4,174,624 | 11/1979 | Shrum | 72/56 |
| 4,248,342 | 2/1981 | King et al. . | |
| 4,325,309 | 4/1982 | King et al. . | |
| 4,686,911 | 8/1987 | Phillips . | |
| 4,781,145 | 11/1988 | Amlinsky et al. . | |
| 4,836,079 | 6/1989 | Barrett | 86/50 |
| 5,339,666 | 8/1994 | Suzuki et al. . | |
| 5,419,862 | 5/1995 | Hampel . | |
| 5,495,812 | 3/1996 | Schulze | 110/237 |
| 5,792,978 | 8/1998 | Woodall, Jr. et al. | 86/50 X |

OTHER PUBLICATIONS

Palamarchuk et al., "Shock Waves and Their Suppression by Foam in Explosive Treatment of Welded Joints", Avtom Svarka 1 (Dialog search abstract only), Jan. 1995.

*Primary Examiner*—Ira S. Lazarus
*Assistant Examiner*—Ljiljana V. Ciric
*Attorney, Agent, or Firm*—Bullwinkel Partners, Ltd.

[57] ABSTRACT

[A method and apparatus for enclosing, controlling and suppressing the detonation of explosives in an explosion chamber is disclosed. The device comprises an elongate double-walled steel explosion chamber anchored to a concrete foundation, and having a double-walled access door for charging new workpieces, and a double-walled vent door for discharging the products of the explosion. The double walls of the chamber, access door and vent door are filled with granular shock damping material such as silica sand, and the floor of the chamber is covered with granular shock-damping bed such as pea gravel. Along the outside of the chamber are steel manifolds from which a linear array of vent pipes penetrates the double walls of the chamber, with each pipe terminating in a hardened steel orifice through which the explosion combustion products pass. Within the chamber, plastic polymer film bags containing water are suspended from steel wires over the explosive material, and at each end of the chamber.] *A method and apparatus for containing and suppressing the detonation of explosives utilizing a sealable double-walled chamber having a floor, an access door and a vent door. The chamber walls are filled, and the floor is covered, with granular shock-damping material. Orificed vent pipes penetrate the chamber walls to vent explosion products into one or more exhaust manifolds. Water-filled bags are positioned around the explosive to absorb energy from the detonation.*

24 Claims, 3 Drawing Sheets

METHOD AND APPARATUS FOR CONTAINING AND SUPPRESSING EXPLOSIVE DETONATIONS

Matter enclosed in heavy brackets [ ] appears in the original patent but forms no part of this reissue specification; matter printed in italics indicates the additions made by reissue.

FIELD OF THE INVENTION

This invention relates to a method and apparatus for containing, controlling and suppressing the detonation of explosives, particularly for the explosion working of metals, and for the disposal of unwanted explosive and toxic materials.

BACKGROUND OF THE INVENTION

Explosives have many useful industrial applications including surface hardening of austenitic manganese alloy steels, surface deposition coating, welding of metallic components, compression molding of components from powders and granular media, and disposal of unwanted explosive or toxic materials.

The prior art reflects many attempts to contain the explosion process for the suppression of noise, shock and noxious polluting explosion products.

Hampel U.S. Pat. No. 5,419,862 discloses a large explosion chamber in which an explosive work piece is introduced in through an air lock into a vacuum chamber where it is detonated, and after detonation the explosion products are allowed to escape into the atmosphere. The chamber is mechanically secured by anchor rods to a foundation.

Gambarov, et al. U.S. Pat. No. 4,100,783 discloses a cylindrical containment vessel, split along its diameter for separation, and openable for the insertion of large work pieces such as railway frogs, stone crusher wear parts and the like. After insertion of a work piece and explosive charge, the chamber is closed and locked and the explosive detonated by a built-in detonating device. The explosion combustion products are allowed to exhaust to the atmosphere through an air valve.

Deribas U.S. Pat. No. 4,085,883 and Minin U.S. Pat. No. 4,081,982 disclose spherical containment vessels with a bottom opening through which a work piece incorporating an explosive is introduced through an elevator means, and continuous feed wire electrodes are used to make contact with an electrically initiated detonator when the work piece is in place. The latter patent also discloses means for introducing an internal liquid spray after the explosion for the purpose of neutralizing toxic by-products of the explosion.

Smirnov, et al. U.S. Pat. No. 4,079,612 discloses a roughly hemispherical containment vessel mounted on a concrete foundation with a shock-absorbing work table for supporting the work piece and explosive material, which are detonated through electric ignition wires leading through openings in the containment vessel to the outside.

A different approach is disclosed by Paton, et al. U.S. Pat. No. 3,910,084 in which multiple closed-end pipes are disposed radially around a central column in which the explosion is initiated, with the shock waves dampened by internal baffles within the tubes. Access is gained to the chamber through a removable top cover plate.

Klein, et al. U.S. Pat. No. 3,611,766 discloses a vertical explosion chamber incorporating a cushioned work table for supporting the work piece and explosive charge, and an internal shock-mounted mechanical dampening means consisting of a steel grate for absorbing the explosive pressure waves. Klein U.S. Pat. No. 3,464,249 discloses a similar containment vessel, in this case spherical, with a bottom covering of loose granular material such as sand which supports the work piece and explosive charge. The explosion products are discharged through a vertical pipe containing a noise silencer, and the entire assembly is supported by shock absorbing means in a reinforced brick or concrete pit for the further suppression of shock and noise.

All of the above prior art devices represent improvements over the methods first used for explosion hardening of manganese steel rail components which involved placing the explosive-covered work piece in an open field, or at the bottom of an open pit such an abandoned gravel pit, and setting off the explosion in the open air with resultant noise, dust, disturbance and contamination of the environment. In addition, the uncontrolled use of explosives required great amounts of space, posed substantial danger to equipment and personnel, and had the undesirable effect of demolishing the ignition leads, the work piece support surface, and everything else within the immediate vicinity of the explosion.

It is therefore the principal object of the present invention to provide an improved method and apparatus for containing, controlling and suppressing the effects of explosive detonations used for industrial purposes. The purpose of the invention is to provide a containment device which can contain and suppress each explosion so that it poses no hazard to surrounding plant and equipment, or to the environment.

A further object is to provide such a method and apparatus which permits rapid and convenient charging and removal of work pieces, thereby achieving much higher rates of production than have been possible using prior art devices and techniques. A related object is to provide an explosive containment vessel which can be constructed inexpensively of common materials using conventional welding techniques but which is sturdy enough to withstand months and years of continuous use without deterioration. A related object is to provide such a device in which inexpensive consumable materials, such as silica sand and pea gravel, are used as damping and shock absorbing agents, rather than complex and expensive internal springs, metal grates, and the like.

Another object is to provide an explosion containment chamber which is readily opened from one end to allow charging and removal of work pieces by conventional means such as a forklift truck, and to allow easy entrance and exit by maintenance personnel. A further object is to provide quick and efficient removal of gaseous explosion by-products after detonation so that maintenance personnel can immediately enter the chamber to remove the treated work piece and put another in place for the next operation.

Still another object is to provide an internal ignition system in which the electrical leads for the detonation initiation system are protected from blast effect and are reusable for a great number of explosion cycles, rather than being destroyed and having to be replaced after each cycle.

Another principal object of the invention is to provide a means of quickly removing and treating the gaseous explosion by-products by passing them through a scrubber system, so that operating personnel can re-enter the chamber immediately while the scrubber continues to process the products of the previous explosion as a new work piece and explosive charge are being readied. Also, it is an object of the scrubber system to further dampen and suppress shock and noise from each detonation by virtue of the extended travel path of the explosion products as they pass through the scrubber.

Finally, a particularly important object of the invention is to provide a simple and inexpensive means for absorbing the unused energy of the explosion, for instantaneously reducing temperatures and pressures within the chamber, while at the same time suppressing dust and particulate matter in the explosion by-products.

SUMMARY OF THE INVENTION

The improved explosion chamber of the invention comprises an elongate double-walled steel explosion chamber anchored to a concrete foundation, and having a double-walled access door for charging new work pieces, and a double-walled vent door for discharging the products of the explosion. The double walls of the chamber, access door and vent door are filled with granular shock damping material such as silica sand, and the floor of the chamber is covered with granular shock-damping bed such as pea gravel.

Along the outside of the chamber are steel manifolds from which a linear array of vent pipes penetrates the double walls of the chamber, with each pipe terminating in a hardened steel orifice through which the explosion combustion products pass.

Within the chamber, plastic polymer film bags containing water are suspended from steel wires over the explosive material, and at each end of the chamber. Electrical igniter lead wires enter the chamber through a steel hood having a downward-facing access opening positioned in a protected location below the surface of the granular bed, but accessible by an operator for quickly attaching an electrical blasting cap.

The access and vent door are interlocked with the electrical igniter to block ignition unless both doors are positively shut. When the doors are opened after a detonation, a vent fan is positioned to exhaust explosion combustion products from the chamber and to draw fresh air in through the access door. The manifolds and vent door discharge into a scrubber for further cooling and environmental treatment of the gaseous combustion products.

The method of operation of the invention comprises the steps of placing an explosive work piece through the access door and onto the granular bed, suspending plastic bags containing an amount of water approximating the weight of explosive, attaching an electrical blasting cap to the igniter lead wires, closing the access and vent door, electrically detonating the explosive, immediately opening both access and vent door, and using fan means for exhausting the combustion products of the detonation from the chamber in preparation for inserting the next explosive work piece.

The gaseous combustion products exiting the manifolds and vent discharge are then cooled and environmentally treated in a scrubber before being released to the atmosphere.

A BRIEF DESCRIPTION OF THE DRAWINGS

DETAILED DESCRIPTION OF THE INVENTION

Figure 1:
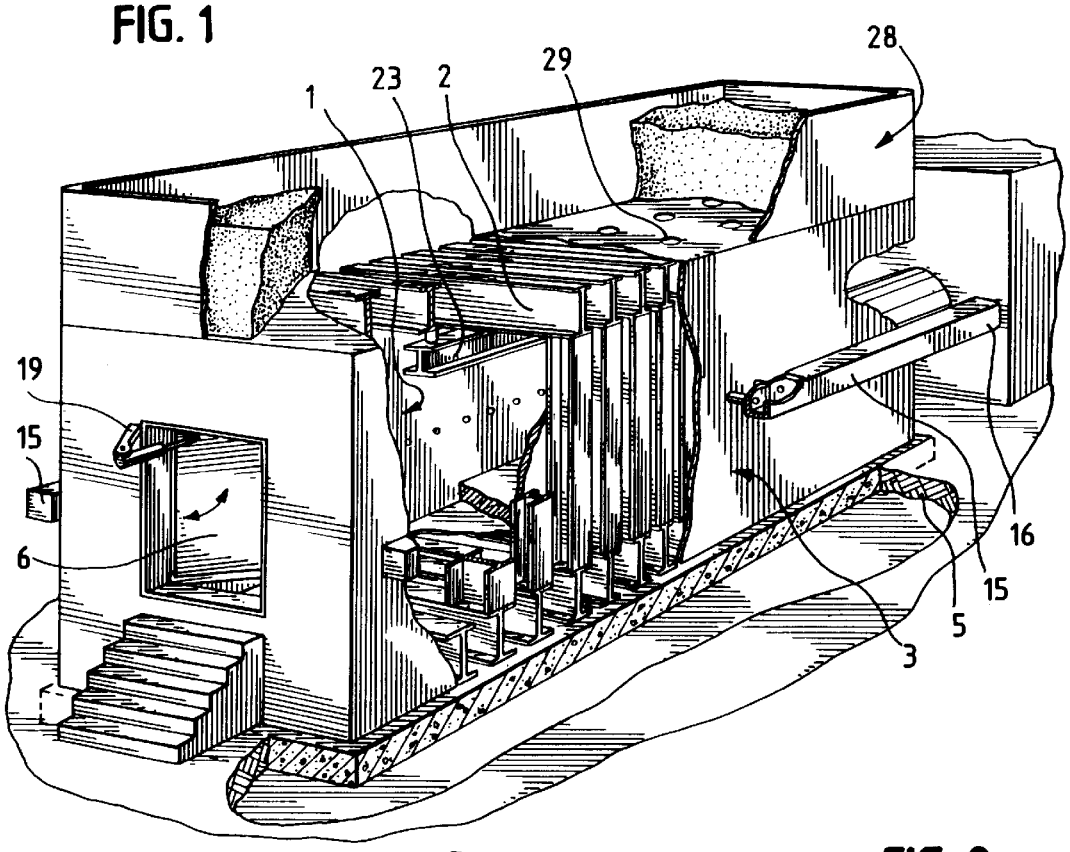
FIG. 1 is a cut-away perspective view of [access door 6 end of] the improved explosion containment chamber of the present invention.
Figure 2:
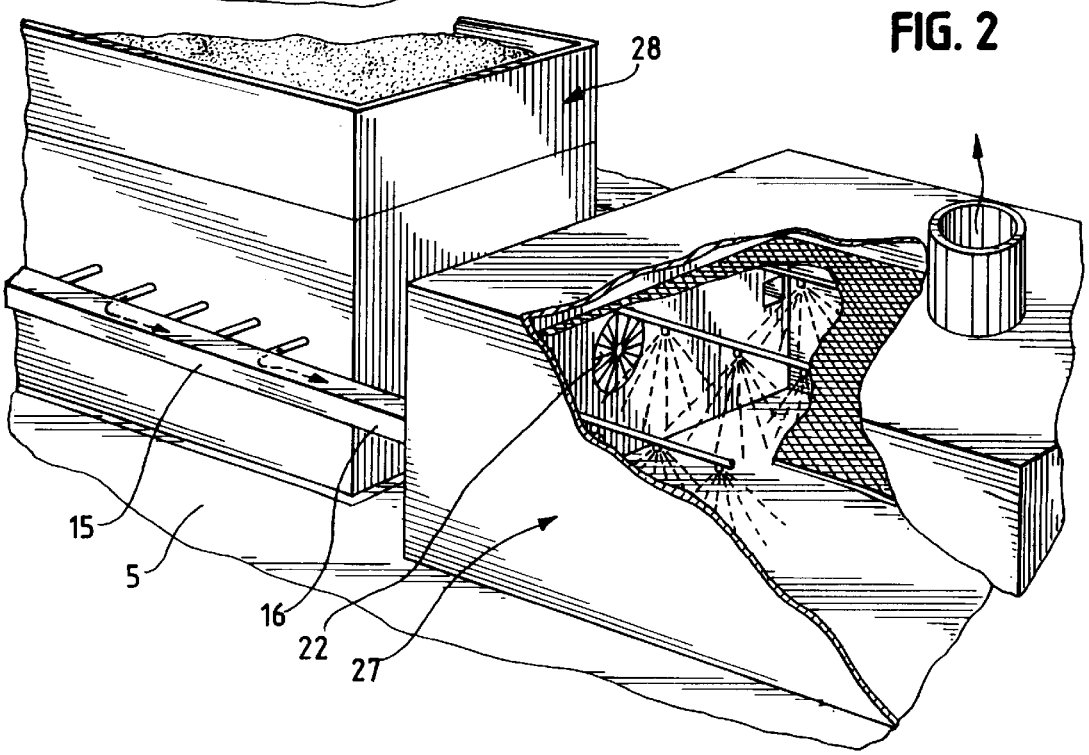
FIG. 2 is a cut-away partial perspective view of the opposite end of the chamber of FIG. 1, including a scrubber for cleaning the gaseous explosion products before venting them to the atmosphere.
Figure 3:
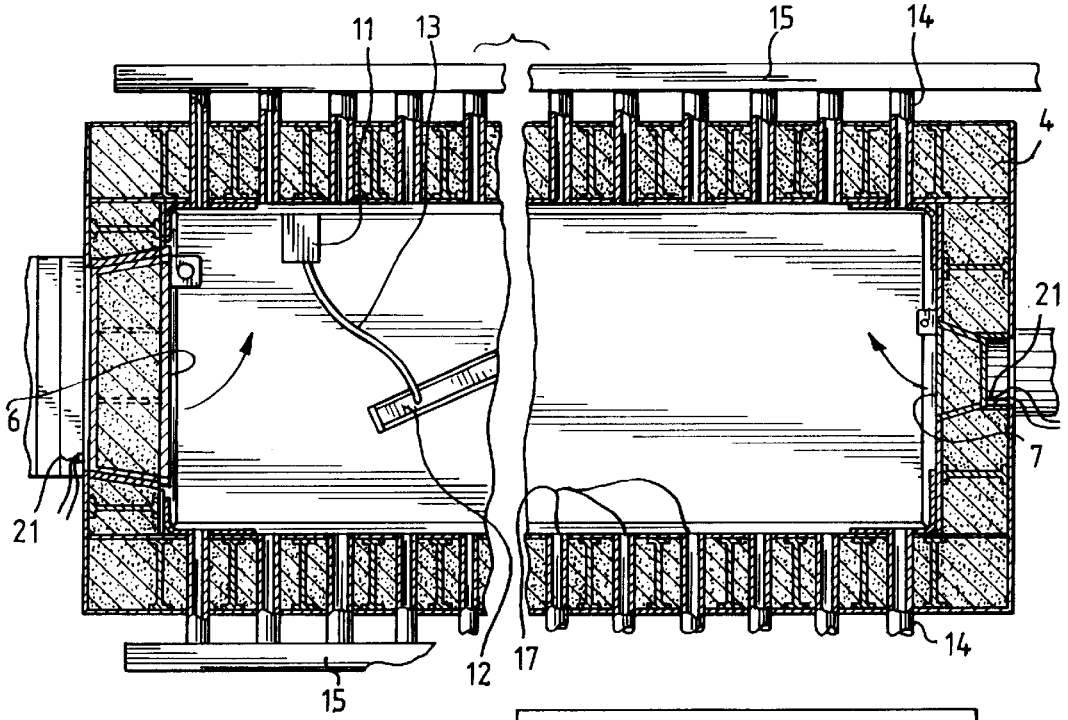
FIG. 3 is a partial sectional plan view of the explosion chamber of the preceding figures.
Figure 5:
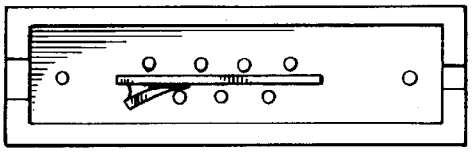
FIG. 5 is a reduced-scale sectional plan view of the full length of the explosion chamber of the preceding figures showing a railroad track work piece in place for explosion hardening treatment.
Figure 4:
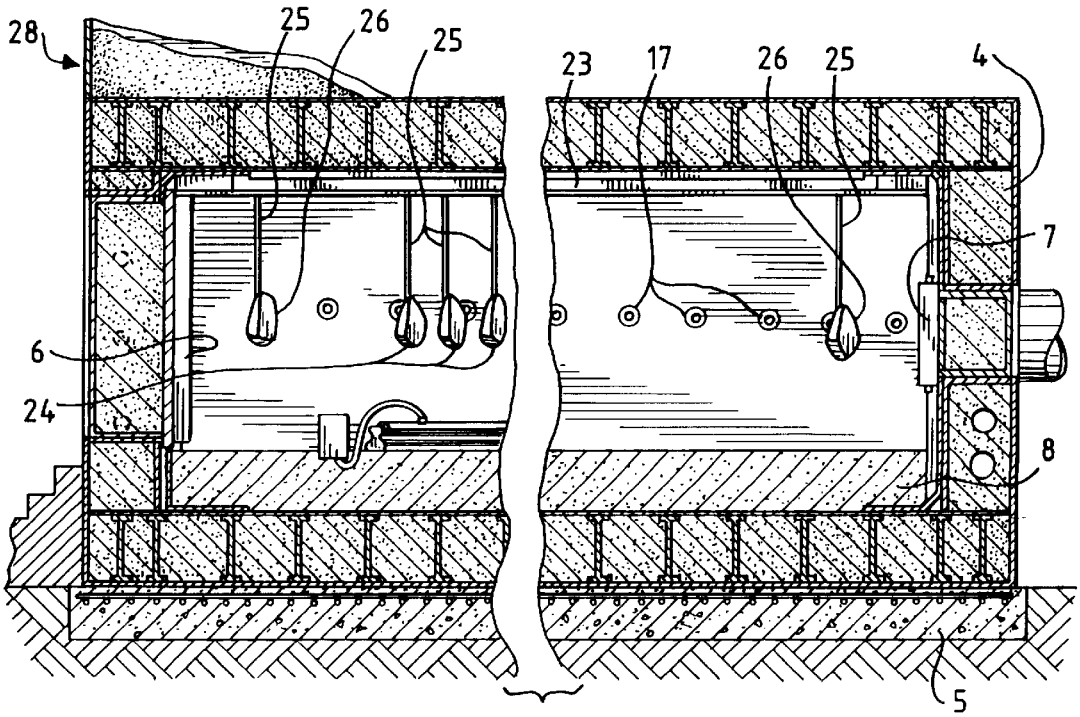
FIG. 4 is a partial sectional side elevation of the explosion chamber of the preceding figures.
Figure 6:
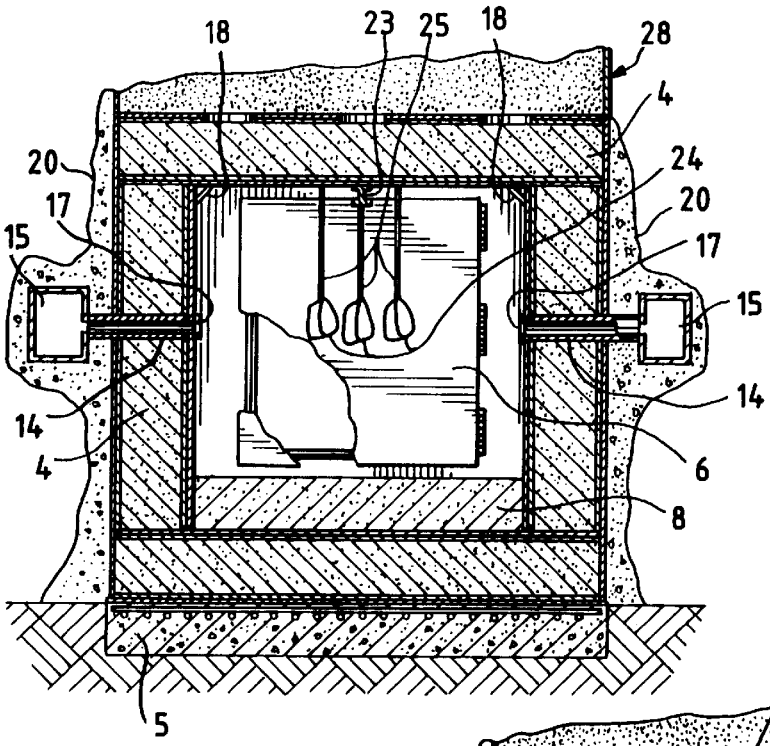
FIG. 6 is a sectional end elevation showing the access door 6 end of the explosion chamber of the preceding figures.
Figure 7:
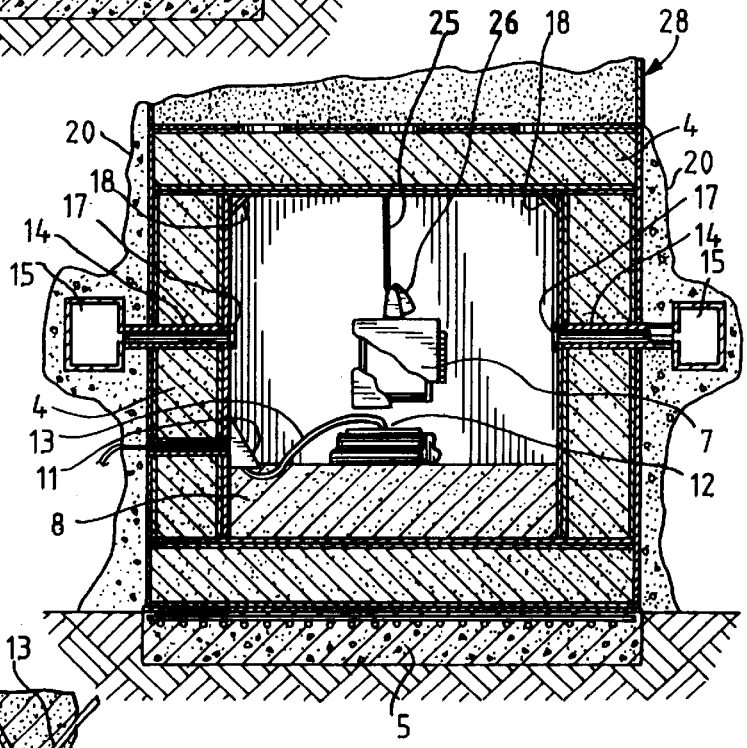
FIG. 7 is a sectional end elevation showing the vent door 7 end of the explosion chamber of the preceding figures, with a piece of rail trackwork in place for treatment.
Figure 8:
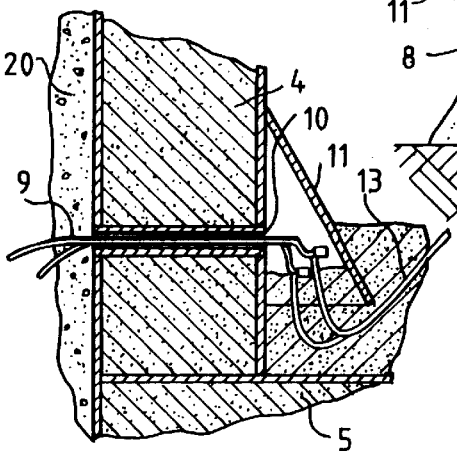
FIG. 8 is an enlarged partial sectional end elevation of the ignition wire entry point into the explosion chamber of the preceding figures.

Turning to the drawings, FIG. 1 is a sectional perspective of the improved explosion chamber of the present invention. The chamber comprises an inner casing 1 having a ceiling, floor, side walls and ends, being fabricated of sheet steel using conventional welding techniques. Surrounding the inner casing 1 are a plurality of spaced circumstantial flanges or ribs 2 over which a welded sheet steel outer casing 3 is constructed so that the ribs 2 cause the outer casing 3 to be spaced from the inner casing 1 and leaving a gap which is then filled with a granular shock-damping material *4*. In the preferred embodiment, the inner and outer metal casings are constructed of three-quarter inch thick sheet steel separated by circumferential steel I-beam ribs 2 spaced every two feet. All seams are continuous-welded. According to the invention, the space between the inner and outer casing 3 is filled with a firm, granular shock-absorbing material, preferably silica sand.

The explosion chamber is anchored by bolts or other suitable means (not shown) to a reinforced concrete foundation 5. In the preferred embodiment shown, the inside dimensions of the explosion chamber are: eight feet high, six feet wide, and fifty feet long. The reinforced concrete foundation 5 is preferably at least four feet thick.

As one of the major advantages of the invention, the internal dimensions of the chamber allow an operator to enter, stand up and work easily, and its length permits long pre-welded sections of railroad trackwork to be inserted and explosion-hardened, which was not possible in prior art explosion chambers.

The chamber is provided with two doors, an access door 6, and a vent door 7. Both doors are constructed of double-walled welded steel similar to the chamber walls, and each is hinged to open in an inward direction. The door jambs are constructed so that each door fits in a sealing relationship so that increased pressure within the chamber causes the door to seal tighter against its frame. The volume within the double-walled doors is also filled with shock-damping material, preferably silica sand.

The floor of the chamber is preferably covered with a bed 8 of granular shock-damping material, preferably pea gravel, to a uniform depth of about one foot, thereby forming a support surface for the work piece and explosive to be detonated.

To initiate ignition of the explosive, electrical wire firing leads 9 penetrate the chamber through a pressure-sealed opening 10 and emerge through a welded sheet steel shield box or hood 11 having a downward-facing opening positioned below the surface of the granular shock-damping material. To prepare the work piece and charge for detonation, a suitable electric detonator cap 12 is inserted into the explosive charge and the ends of its wire leads 13 are routed over to the firing wire hood 11. The pea gravel is scooped away to expose the ends of the firing wire leads 9, the leads are twisted together to complete the firing circuit, and then the pea gravel is swept back over the detonator cap leads 13 to again surround and enclose the open end of the hood 11. While the detonator cap leads 13 are substantially disintegrated by the explosion, the firing wire leads 9 remain protected under the hood 11 and may be re-used repeatedly.

As a principal feature of the invention, shock suppression means are provided for the chamber in the form of a plurality of vent pipes disposed along the centerline of each interior side wall of the chamber, with each vent pipe communicating through the chamber double wall into an elongated steel manifold 15 means extending alongside the chamber on each side and terminating in a discharge outlet 16. In the preferred embodiment each manifold 15 is ten inches square and is fabricated by continuous-seam welding from one-half 2 inch steel plate. The ribs 2 consist of eighteen-inch I-beam sections spaced at two foot intervals. The vent pipes 14 are of two inch diameter steel tubing, and like the ribs 2 are spaced at two foot intervals. Where it connects to the inner wall of the chamber, each vent pipe is fitted [at] with a hardened steel orifice 17 three-quarters of an inch in diameter. In the preferred embodiment, the fifty-foot chamber has twenty-four vent pipes 14 and orifice 17 per side, for a total of forty-eight vent pipes 14 and orifice 17 in all.

Within the chamber, square corners are avoided because of the tendency of explosives to exert unusually high pressures at such critical points. Therefore, a fillet piece 18 is welded into each corner to break the 90° square corner into two 45°, which has the effect of rounding the corner and eliminating stress-raising corners or pockets which would otherwise impose undesirable destructive forces on the corner welds.

In the preferred embodiment of the invention, additional sound suppression is obtained by coating the exterior surfaces of the outer chamber and manifold 15 with a polyurethane rigid foam coating 20 of known composition to a depth of at least four inches. The entire foam-covered structure is further enclosed in an enclosure such as a sturdy wooden shed (not shown) having screened ventilating slots to permit free circulation of air.

To open and close the access and vent door 7, double-acting hydraulic cylinders 19 are provided. As a further feature of the invention, important safety objectives are realized by providing each door with sensor means 21 as part of an electrical interlock (not shown) between the access door 6, vent door 7 and ignition means, whereby the access door 6 must both be in a closed and sealed position before the ignition means can be energized. In this way it is impossible to inadvertently detonate an explosive charge prematurely before the doors are fully closed, the result of which would be substantial destruction and damage to equipment such as the vent fan 22, not to mention the risk of bodily injury to operating personnel in the vicinity of the access door 6.

In the preferred embodiment the chamber ceiling is fitted with a welded I-beam for use as a trolley to insert and remove particularly long lengths of steel trackwork or other work pieces of a similar shape.

Another principal feature of the invention is the provision for each explosion of [a] liquid-filled energy absorption modules disposed roughly along the interior centerline of the chamber. These devices serve to cool the gaseous explosion products, and to suppress dust and debris in the chamber after each explosion.

In the preferred embodiment, the energy absorption devices are simple self-sealing polyethylene bags filled with water and hung on hanger wires 25 approximately along the center line of the chamber above and around the work piece and explosive charge. It has been discovered that commercially available "Zip-Lock" brand sandwich bags, six by eight inches in dimension and 0.002 inches (two mils) thick are satisfactory for this purpose. While water is preferable, any suitable energy-absorbing vaporizable material can also be used.

According to the invention, the volume of water placed in the chamber for each explosion is selected to be approximately equal in weight to the amount of explosive to be detonated. This volume of water is distributed among several bags which are then hung in a staggered array approximately along the center line of the chamber in the vicinity of the explosive. Preferably, the water bags 24 are hung on the hooked ends of nine-gauge steel rods [are] welded to the ceiling of the chamber.

By using the water-filled energy absorption means, it has been found that the instantaneous theoretical pressure of the explosion is reduced by more than half, and the introduction of moisture into the chamber at the moment of detonation and thereafter has a beneficial effect of suppressing dust and cooling the explosion products instantly. In contrast to explosions without the use of the water-filled bags, the perceived impact and noise of the explosion is substantially reduced, and operating personnel are [enabled] *able* to enter the chamber immediately after each detonation to remove one work piece and replace it with the next.

It has also been found in practice that the beneficial effects of the water bags 24 are enhanced if an additional water bag 26 is placed at each end of the chamber, away from the work piece, approximately four feet from the access door 6, and twelve feet from the vent door 7, although other spacings are satisfactory also.

In practice, using the water bags 24 in the manner of the invention results in the complete vaporization of both the water and the polyethylene bags, serving to absorb and suppress the undesired shock of the explosion, while leaving behind virtually no debris or residue. After each explosion, the access door 6 can be opened immediately, and all that can be seen are wisps of water vapor which are swept out the vent door 7 in the manner described further herein.

According to another important feature of the invention, all gaseous explosion by-products are quickly exhausted from the chamber in a controlled manner. After each explosion, the vent door 7 and access door 6 are simultaneously opened, the vent fan 22 is energized, and the gaseous explosion products from the chamber are drawn through the vent door 7 opening while the atmosphere in the chamber is replaced with fresh air drawn through the open access door 6. In practice, using the method and apparatus describe, it has been found that the access and vent door 7 may be immediately opened after each explosion, thereby permitting operating personnel to enter the chamber immediately after each explosion to remove the treated work piece and replace it with the next.

Another major feature of the present invention is that all gaseous explosion products are controllably discharged and directed into a suitable environmental treatment means such as a scrubber 27. In the illustrated embodiment, a water-spray scrubber 27 of conventional construction is used to receive the discharge from both side-mounted manifold 15, and from the vent fan 22 as well, so that no gaseous explosion products escape to the atmosphere untreated. In addition, the tortuous path offered by the scrubber 27 creates a further level of advantageous shock and noise suppression.

To permit the refilling of gaps in the chamber walls caused by settling of the shock damping silica sand, a bin or hopper 28 is provided above the chamber with spaced openings 29 through which sand may move to replace lost volume as the sand in the walls settles or compacts with each detonation. It has been found that despite such compaction, the use of silica sand (as opposed to masonry sand) does not result in any diminishing of the shock-damping effect.

Despite the immense destructive forces of each explosive detonation, the chamber of the present invention, with its vent pipes 14 and energy absorbing liquid modules, has been found in practice to diminish the surplus destructive energy of each explosion to a point where the trolley beam 23 is virtually unaffected. Similarly, the depending wires for hanging the energy absorption water bags 24 are virtually unaffected after each blast. This allows the chamber to be used continuously, with a productive output of as many as 10 or 12 explosions per hour, which is an order of magnitude greater than permitted by any of the explosion chambers of the prior art, or by conventional open-pit explosive techniques.

In practice, with the preferred embodiment described, the method and apparatus of the present invention has been successfully utilized to safely detonate explosive charges in a wide range of sizes, ranging from two to fifteen pounds of C2 plastic explosive (also know as PETN), with minimal amounts of shock, noise and adverse effect on the environment. Surprisingly, it has been found that business office operations in an adjoining office building only two hundred feet away from the explosion chamber can be conducted in a completely normal manner, with the explosions being indistinguishable from the ordinary background noise of the office environment.

I claim:

1. An apparatus for containing and suppressing [explosions] *a detonation of an explosive, said apparatus* having a chamber, at least one sealable door, and ignition means for detonating [an] *the* explosive [charge] within the chamber, and characterized by a plurality of plastic film containers filled with water and suspended in a spaced array within the chamber above the explosive to be detonated.

2. An apparatus for containing and suppressing [the explosions] *a detonation of an explosive* comprising:

a closed elongated metal inner casing having a ceiling, a floor, side walls and ends, and a closed elongated metal outer casing spaced from the inner casing, surrounding the inner casing to form an elongated axially symmetrical double-wall chamber having a central axis[,]*;* spacer means for connecting the outer casing to the inner casing in rigid spaced relationship, with the space between the inner and outer casings being filled with granular shock-damping material[,]*;* an openable access door at one end and an openable vent door at the other end, said access and vent doors each being of double-walled metal construction and having sealing means for causing said doors to seal tighter with increasing differential pressure within the chamber[,]*;* additional granular shock-damping material covering the floor of said chamber to an even depth forming a support surface for [an] *said* explosive to be detonated, and ignition means for detonating said explosive[, and]*;* shock suppression means including a plurality of vent pipes connecting the [inside wall of the chamber] *inner casing side walls* with an elongated metal manifold [means] for receiving and directing explosion products from the vent pipes, said manifold [means] terminating at an external discharge point[,]*;* and a plurality of liquid-filled energy absorption modules suspended in a spaced array substantially along the central axis of the chamber above [the] *said* explosive to be detonated.

3. The apparatus of claim 2 in which the energy absorption modules comprise plastic film containers filled with water, with the mass of water being substantially equal to the explosive to be detonated.

4. The apparatus of claim 3 in which the containers are individual bags made of polyethylene sheet material, and the chamber ceiling has a plurality of depending wire supports from which the bags are hung.

5. The apparatus of claim 3 in which an additional water-filled bag is disposed along the central axis of the chamber near each end.

6. The apparatus of claim 4 in which the wire supports are made of 9 gauge steel cable.

7. The apparatus of claim 4 in which the bags are commercially available self-locking sandwich bags of about 8.0 ounce liquid capacity.

8. The apparatus of claim 2 in which the ignition means includes electrical igniter wires entering the chamber through a steel hood having [an] *a* downward-facing access opening positioned below the [surface of the granular bed] *support surface of the granular shock-absorbing material*, through which the leads of an electric blasting cap may be attached.

9. The apparatus of claim 2 in which the access door and vent door have sensor means for electrically locking out the ignition means when either door is not in a closed and sealed condition.

10. The apparatus of claim 2 including exhaust fan means for evacuating gaseous explosion combustion products of the detonation through the vent door, and drawing fresh air from the access door to fill the chamber after an explosion.

11. The apparatus of claim 10 including [conduit] means for receiving gaseous explosion *combustion* products discharging from the manifold discharge point and vent door after an explosion, and directing them to a [scrubber] *scrubbing* means for stripping said gaseous explosion combustion products of particulate matter and noxious vapors.

12. [The] *A* method for suppressing and containing explosions within a chamber having at least one sealable door and ignition means for detonating an explosive [charge] within the chamber, comprising the steps of*:* charging the chamber with [an] *said* explosive [workpiece] *to be detonated*, attaching ignition means to [the] *said* explosive, suspending a plurality of plastic film containers filled with water in a spaced array within the chamber above [the] *said* explosive, closing and sealing the chamber doors, detonating [the] *said* explosive, opening the chamber doors, and exhausting the gaseous explosive combustion products through the door before re-loading the chamber with a new explosive [workpiece].

13. A method for containing and suppressing [the] *a* detonation of an explosive comprising the steps of:

first, placing [an] *said* explosive [charge] in an enclosed chamber, said chamber comprising:

a closed elongated metal inner casing having a ceiling, a floor, side walls *defining a central axis* and *two* ends[, and]*;* a closed elongated metal outer casing spaced from the inner casing[,] *and* surrounding the inner casing [to form an elongated axially symmetrical double-wall chamber having a central axis,]*;*

[spacer] *spacing* means for connecting the outer casing to the inner casing in rigid spaced relationship, [with] *said outer and inner casing defining a space therebetween,* the space between the inner and outer casings being filled with granular shock-damping material[,]*;* an openable access door at one end *of the inner casing* and an openable vent door at the other end, said access and vent doors each being of double-walled metal construction and having sealing means for causing said doors to seal tighter with increasing differential pressure within the chamber[;]*;* additional granular shock-damping material covering the floor of said [chamber] *inner casing* to an even depth forming a support surface for [an] *said* explosive to be detonated[, and]*;* ignition means for detonating said explosive[,]*;* and shock suppression means including a plurality of vent pipes connecting the [inside wall of the chamber] *inner casing side walls* with an elongated metal manifold [means] for receiving and directing explosion products from the vent pipes, said manifold [means] terminating at an external discharge point[, ]*;* second, placing a plurality of liquid-filled energy absorption modules suspended in a spaced array substantially along the central axis [of the chamber] above [the] *said* explosive to be detonated[,]*;* third, closing and sealing the access and vent doors[,]*;* and fourth, detonating said explosive.

14. The method of claim 13 including the further steps of opening said vent door and access door and evacuating [the] gaseous explosion combustion products of the detonation through the vent door, while allowing fresh air to fill the chamber from the access door.

15. The method of claim 13 including the further steps of directing [the] gaseous explosion combustion products from the manifold [means] and from the access door into a [scrubber] *scrubbing* means for stripping said gaseous explosion combustion products of particulate matter and noxious vapors.

16. The method of claim 13 in which the energy absorption modules comprise plastic film containers filled with water, with the mass of water being substantially equal to the explosive to be detonated.

17. The method of claim 16 in which the containers are individual bags made of polyethylene sheet material, and the [chamber] *inner casing* ceiling has a plurality of depending wire supports from which the bags are hung.

18. The method of claim 17 in which the wire supports are made of 9 gauge steel cable.

19. The method of claim 17 in which the bags are commercially available self-locking sandwich bags of about 8.0 ounce liquid capacity.

20. The method of claim 17 in which an additional water-filled bag is disposed along the central axis [of the chamber] near each end of the [container] *inner casing*.

21. The method of claim 13 in which the ignition means includes electrical igniter wires entering the chamber through a steel hood having an downward-facing access opening positioned below the [surface of the granular bed] *support surface of the granular shock-damping material*, through which [the] leads of an electric blasting cap may be attached.

22. The method of claim 13 including the step of sensing the position of the access door and vent door, and electrically locking out the ignition means when either door is not in a closed and sealed condition.

*23. An apparatus for containing and suppressing a detonation of an explosive, said apparatus having a chamber, at least one sealable door, and ignition means for detonating an explosive within the chamber, and characterized by a plurality of modules containing an energy absorbing substance, said modules positioned a spaced array, within the chamber, around the explosive to be detonated.*

*24. A method for suppressing and containing a detonation of an explosive within a chamber having at least one sealable door and ignition means for detonating an explosive within the chamber, comprising the steps of charging the chamber with the explosive to be detonated, attaching ignition means to the explosive, positioning a plurality of modules containing an energy absorbing substance said modules positioned in a spaced array, within the chamber, around said explosive, closing and sealing said at least one door, detonation, said explosive, opening said at least one door, and exhausting the gaseous explosive combustion products through said at least one door before re-loading the chamber with a new explosive.*

* * * * *